Patented Apr. 25, 1933

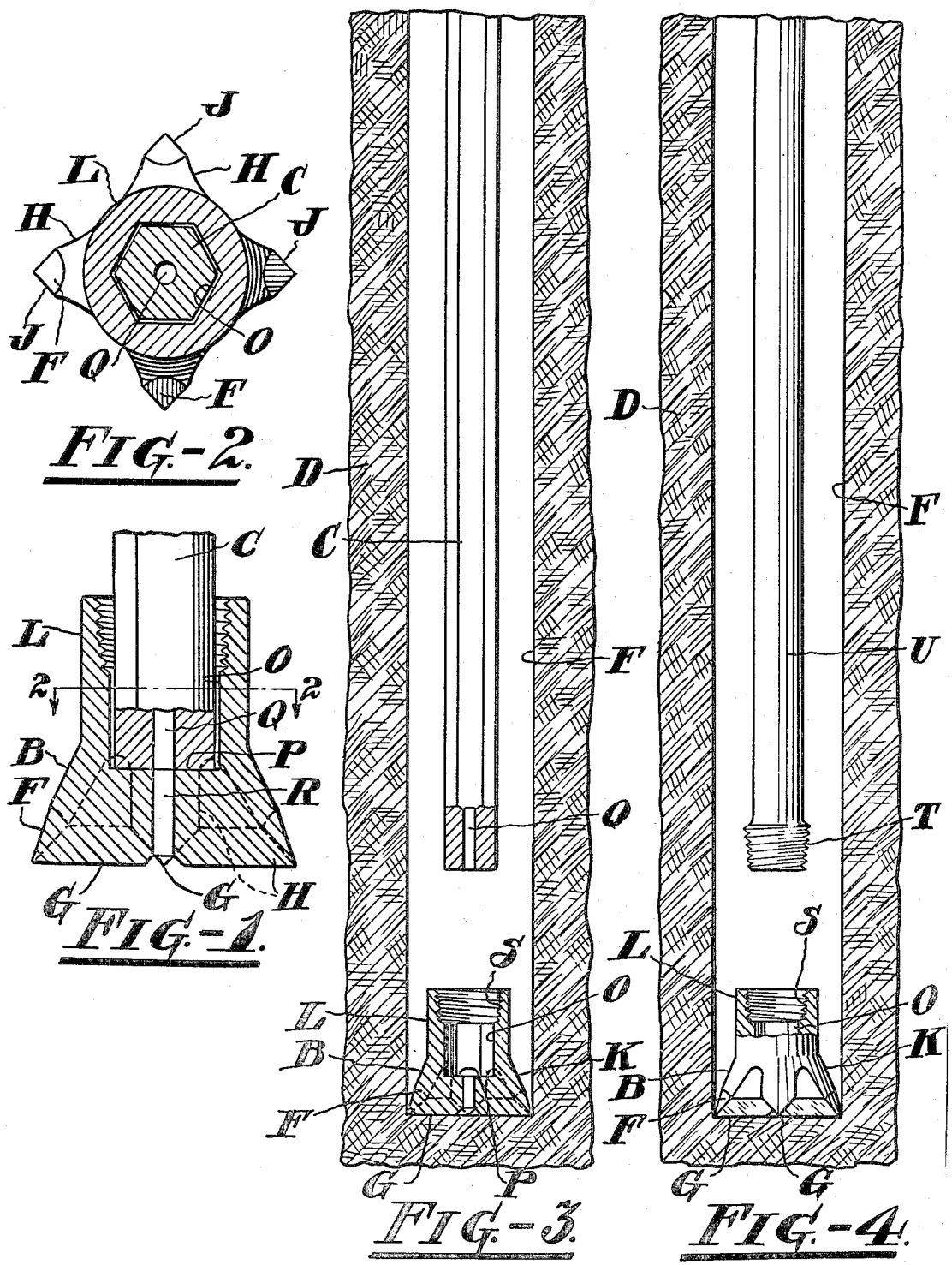

1,905,497

UNITED STATES PATENT OFFICE

ARTHUR E. PETERS, OF PHILLIPSBURG, NEW JERSEY, ASSIGNOR TO INGERSOLL-RAND COMPANY, OF JERSEY CITY, NEW JERSEY, A CORPORATION OF NEW JERSEY

WORKING IMPLEMENT FOR PERCUSSIVE TOOLS

Application filed February 5, 1932. Serial No. 591,071.

This invention relates to working implements, but more particularly to working implements of the type employed in connection with percussive drilling mechanism for drilling rock and like materials.

One object of the invention is to enable the cutting element to be actuated into the rock by successive stages and through the instrumentalities of a series of shanks of progressively increasing lengths without necessitating the removal of the cutting element from the drill hole to change the shanks.

Another object is to enable the shanks to be conveniently connected to the cutting element.

A further object is to enable the shank to be expeditiously and conveniently connected to the cutting element at the end of each drilling operation or stage of advancement of the working implement into the rock without removing the cutting element from the drill hole.

Other objects will be in part obvious and in part pointed out hereinafter.

In the drawing accompanying this specification and forming a part thereof and in which similar reference characters refer to similar parts, Figure 1 is an elevation, partly in section, of a cutter head and its shank constructed in accordance with the practice of the invention, Figure 2 is a transverse view taken through Figure 1 on the line 2—2 looking in the direction indicated by the arrows.

Figure 3 is a sectional elevation showing a cutter head in the bottom of a drill hole and a shank in position to be operatively connected to the cutter head, and Figure 4 is a view similar to Figure 3 illustrating the manner in which the cutter head may be removed from the drill hole.

Referring more particularly to the drawing, the working implement comprises a cutter head B and a shank C which serves both as a means for guiding the cutter head B and for transmitting thereto the blows of a percussive tool, such as a rock drill (not shown), whereby the working implement is actuated into the material or rock D for drilling holes E.

The cutter head B comprises a bit portion F which may be of the cruciform type having mutually perpendicular cutting edges G on the forward extremities of wings H arranged at the front end of the cutter head B. In accordance with the usual practice, the wings H are provided on their lateral faces with reaming edges J which serve to remove such irregularities or protuberances on the surface or wall of the drill hole E as might otherwise hamper the action of the working implement. The reaming edges J, moreover, present a large area to the rock face and thus serve, to a considerable extent, in maintaining the nominal gauge or diameter of the cutting portion of the head B.

The surfaces K of the wings H which lie rearwardly of the reaming edges J are inclined and merge into the outer surface of an extension L which constitutes the rearward portion of the cutter head B. The outer surface of the extension L may, as shown, be of cylindrical shape and within the extension is a socket O which opens from the rear end of the extension and has a seating surface P at its front end.

In transverse section the socket O is preferably of polygonal shape to accommodate a shank C of the same conformation. These elements are, moreover, of substantially uniform cross sectional area throughout although the shank is somewhat smaller than the socket to assure ample clearance between the two so that they may be conveniently connected together by longitudinal slidable movement and without requiring the use of special implements.

By reason of the flat surfaces which define the shape of the shank and the socket the shank and the cutter head will be adequately interlocked against relative rotary movement. In this way, upon rotation of the shank C, the cutter head will rotate with the shank to change the position of the cutter head for each successive blow of the percussive element against the shank C.

In the shank C and the cutter head B are registering passages Q and R, respectively, for conveying cleansing fluid to the bottom of the drill hole E to remove the cuttings therefrom.

In order that the cutter head B may be conveniently extracted from the drill hole E upon completion thereof the extension L is provided with a threaded portion, as for instance, an internally threaded portion S at the rear or open end of the socket O. The threaded portion S is preferably tapered, as illustrated, to form a convenient guide for the shank C into the socket O and also to facilitate the operation of connecting thereto the threaded end T of an extractor U which may be employed for removing the cutter head from the drill hole E.

The operation of the device is as follows: Whenever it is intended to drill a hole in the material or rock D the cutter head B is placed on the end of a shank C and is driven into the rock to the extent which the shank C will permit. The shank C is then withdrawn from the socket O while the cutter head B occupies a position in the bottom of the drill hole E. A shank C of greater length, that is, one of a set of shanks of progressively increasing lengths, is then inserted into the drill hole and entered into the socket O to advance the cutter head further into the rock. This operation may continue indefinitely or until a hole of the desired depth has been drilled. The shank employed for effecting the final stage of advancement of the cutter head may then be removed and the extractor U be lowered into the drill hole and threaded into the portion S of the cutter head for withdrawing it from the drill hole.

In practice the present invention has been found to be highly satisfactory and efficient as a means for drilling holes in rock. By reason of the fact that the shank or shanks may be inserted into the cutter head by longitudinal movement the operation of connecting the two may be performed without removing the cutter head from the drill hole. This feature is a great advantage in devices of this character as it eliminates the necessity of complex securing devices which not only add to the cost of construction and maintenance, but cause the loss of a great deal of time in forming the connection between the head and the shank.

Another desirable advantage flowing from the present invention is that, owing to the fact that the cutter head may remain in the drill hole and only the shanks are removed therefrom, the connection may be expeditiously effected without costly delays such as are frequently occasioned by accumulations of detritus above the cutter head and which, of course, resist withdrawal of the working implement.

According to the present invention, any cuttings which may accumulate around the extension L and which would, under the present mode of drilling, hinder the withdrawal of the cutter head from the drill hole may remain in the position wherein they have lodged until the final drilling operation, that is, until the drill hole is completed. As a result of the present arrangement it becomes necessary to remove the cutter head only once during the drilling of each hole against whatever resistance such accumulated cuttings may offer.

Although the drawing illustrates only one form of slidable connection between the shank and the cutter head and which may be effected by longitudinal movement of either or both, it will be obvious to those skilled in the art that the invention is susceptible of considerable variation without departing from its spirit or from the scope of the claims.

I claim:

1. The method of drilling holes in rock and like materials which consists in driving a cutter head and its shank into the rock to the extent permitted by the shank, then withdrawing the shank from the cutter head and the hole and inserting another shank into the cutter within the hole to advance the cutter into the rock.

2. The method of drilling holes in rock and like materials which consists in disposing a cutter head slidably on a shank, then driving the cutter head into the rock to the extent permitted by the shank, next withdrawing the shank from the cutter head and leaving the cutter head remain in the rock, and then inserting a longer shank into the cutter head to advance it into the rock.

In testimony whereof I have signed this specification.

ARTHUR E. PETERS.